United States Patent [19]
Rogers et al.

[11] Patent Number: 5,458,365
[45] Date of Patent: Oct. 17, 1995

[54] ADJUSTABLE SNAP AWAY FASTENER

[75] Inventors: Mark Rogers, Roy; Larry D. Rose, Layton; Donald R. Lauritzen, Hyrum, all of Utah; Melinda M. Newhouse, Kennewick, Wash.

[73] Assignee: Morton International, Inc., Chicago, Ill.

[21] Appl. No.: 101,187

[22] Filed: Aug. 3, 1993

[51] Int. Cl.⁶ .................................................. B60R 21/16
[52] U.S. Cl. .......................... 280/728.3; 280/732; 403/65; 403/150
[58] Field of Search .......................... 280/728 B, 728 R, 280/731, 732; 403/65, 66, 68, 150; 411/174, 175, 537, 338, 339, 480, 923, 508, 509

[56] References Cited

U.S. PATENT DOCUMENTS

| | | | |
|---|---|---|---|
| 1,330,673 | 2/1920 | Anderson | 411/339 |
| 2,236,850 | 4/1941 | Hansman | 411/174 |
| 3,112,667 | 12/1963 | Brentlinger | 411/923 |
| 3,382,630 | 5/1968 | Chivers | 411/537 |
| 4,770,439 | 9/1988 | Maier et al. | 280/732 |
| 5,062,663 | 11/1991 | Satoh | 280/743 |
| 5,150,919 | 9/1992 | Sakakida et al. | 280/732 |
| 5,199,739 | 4/1993 | Fujiwara et al. | 280/732 |
| 5,211,421 | 5/1993 | Catron et al. | 280/728 |
| 5,354,094 | 10/1994 | Matano et al. | 280/728 B |

FOREIGN PATENT DOCUMENTS

| | | | |
|---|---|---|---|
| 415362 | 3/1991 | European Pat. Off. | |
| 2496188 | 6/1982 | France | F16B 2/22 |
| 4139010 | 6/1992 | Germany | |
| 4-191140 | 7/1992 | Japan | 280/728 B |
| 5000648 | 1/1993 | Japan | B60R 21/20 |

Primary Examiner—Eric D. Culbreth
Attorney, Agent, or Firm—George W. Rauchfuss, Jr.; Gerald K. White

[57] ABSTRACT

The deployable door of a passenger-side vehicle airbag restraint system is simultaneously fastened into an instrument panel opening and into engagement with the airbag module reaction canister. A spring clip on the canister receives a probe which is secured to the door through a pivoted breakaway connection. The probe is easily inserted into the clip but can be withdrawn only with difficulty. Airbag inflation thereafter separates the breakaway connection preferentially to the spring clip connection.

20 Claims, 2 Drawing Sheets

ADJUSTABLE SNAP AWAY FASTENER

TECHNICAL FIELD

This invention relates to the field of automotive airbag restraint systems. More particularly, it relates to the interconnection between the airbag reaction canister and the airbag deployment door of the instrument panel.

BACKGROUND ART

In passenger side airbag restraint systems, the airbag reaction canister is mounted behind the vehicle's instrument panel. A portion of the instrument panel forms a deployment door which is designed to break away under the influence of the inflating airbag. It is crucial to the airbag operation that the door completely separates from the instrument panel and moves out of the way of the inflating bag. However, it is also important that the door fit snugly into the instrument panel so as to present an aesthetically pleasing appearance.

It has been difficult to achieve these objectives during the vehicle assembly or upon airbag replacement. This has been due to the fact that the snap fastening means required relatively precise positioning to assure proper alignment of the door. Accordingly, it is a primary object of the present invention to provide a snap fastening system which permits substantial flexibility between a connector on the reaction can and a connector on the door but holds the door firmly in position on installation by the assembler. Another object is to permit the breakaway force to be varied for different installations. Other objects, features, and advantages will become apparent from the following description and the appended claims.

DISCLOSURE OF INVENTION

A system is provided for fastening an instrument panel deployment door of an automotive airbag restraint system simultaneously into the instrument panel opening and into engagement with the airbag module reaction canister. A spring clip is mounted on either the reaction canister or the deployment door. The clip defines an opening which is adapted to receive an elongated probe which is inserted therethrough. It is also resistant to subsequent withdrawal of the probe. A base member is mounted on the other of the canister and deployment door. An elongated probe has a first end which pivotally engages the base member. It is forcibly detachable therefrom. A second end of the probe member is adapted to enter the opening of the clip as the deployment door is positioned into the instrument panel opening.

BEST MODE FOR CARRYING OUT THE INVENTION

Figure 1:
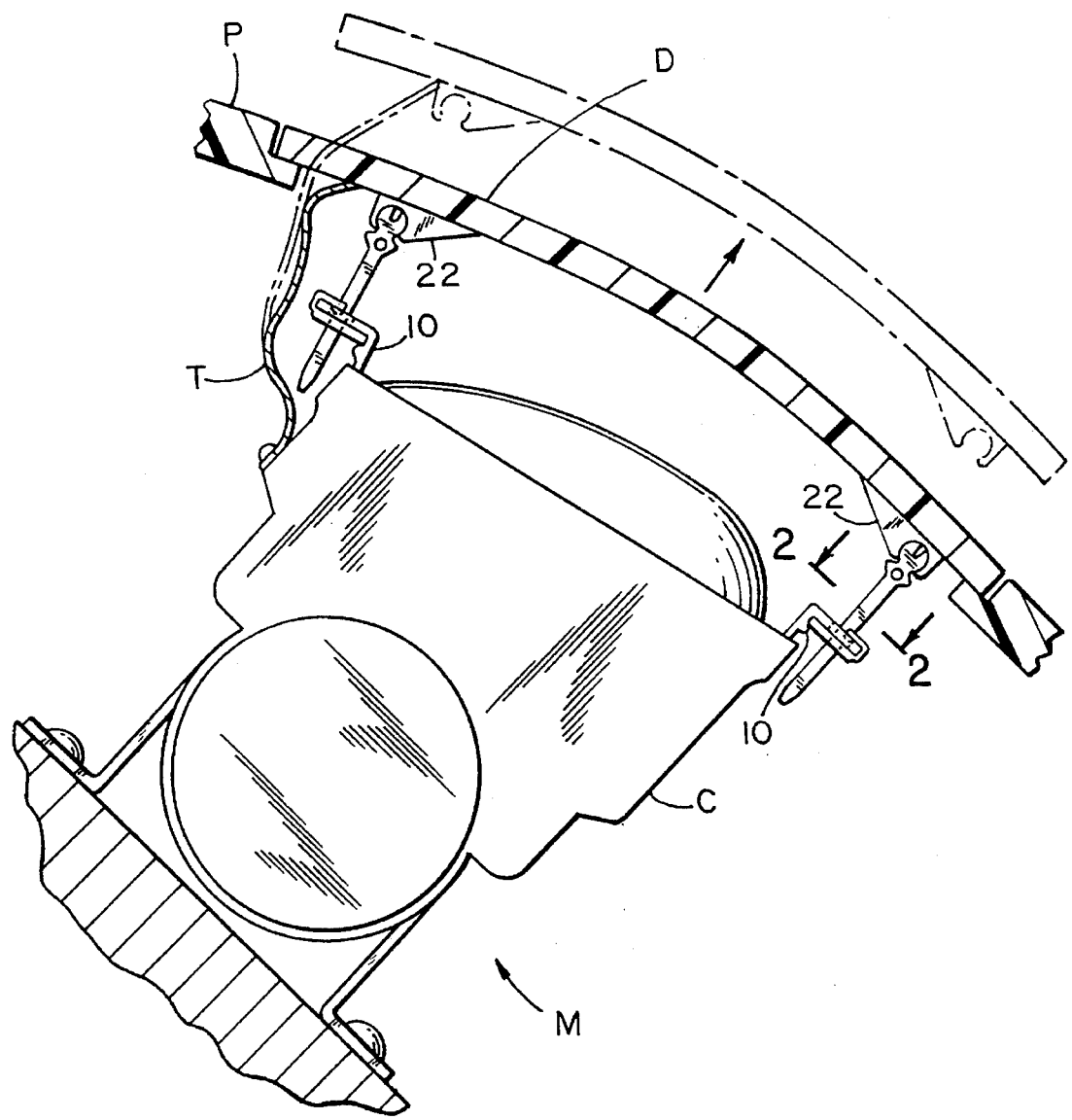
FIG. 1 is an elevational view of an airbag module reaction canister and the instrument panel deployment door connected thereto.
Figure 2:
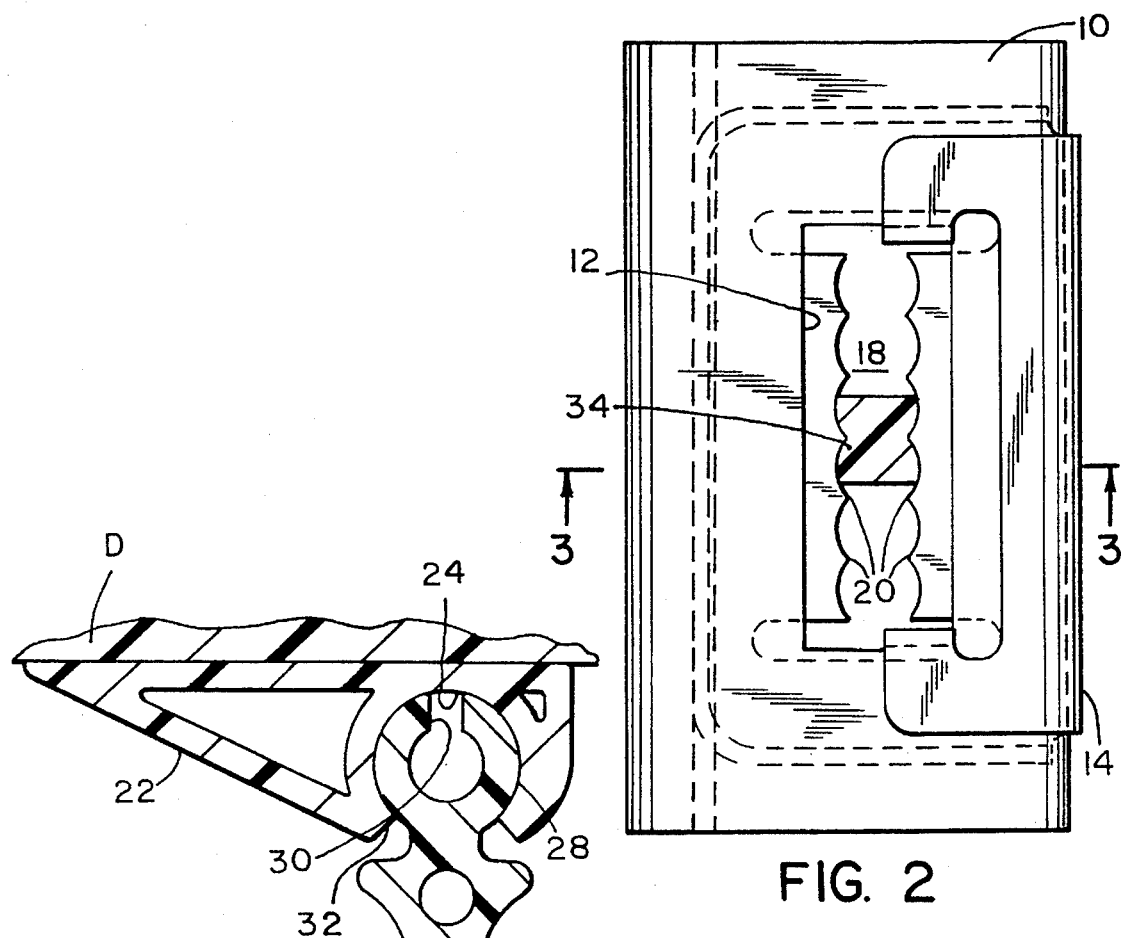
FIG. 2 is an enlarged cross-section taken substantially along the line 2—2 of FIG. 1.

FIG. 1 illustrates a passenger side airbag module M including a reaction canister C to which is secured a deployable door D mounted in an opening of instrument panel P. A conventional tether T restrains movement of the door D upon airbag inflation. The construction of the snap away fastener of this invention is shown most clearly in FIGS. 2 and 3. The reaction canister C includes a pair of L-shaped brackets 10 on opposite sides of the canister opening. Each includes a central opening 12. A substantially U-shaped spring clip 14 is mounted on each of the brackets 10. The spring clip 14 may be of a metal such as steel and includes an upper surface which engages the ends of the opening 12 by means of downwardly extending tabs 16. The bottom leg of the spring clip 14 underlies the opening 12 and itself defines an opening 18 surrounded by serrated margins forming teeth 20.

Mounted on the inner surface of the deployment door D are a pair of base members 22. Alternatively, these members may be integral parts of the door D. The base members 22 are plastic and may be molded or extruded. Each defines a cylindrical socket 24.

Figure 3:
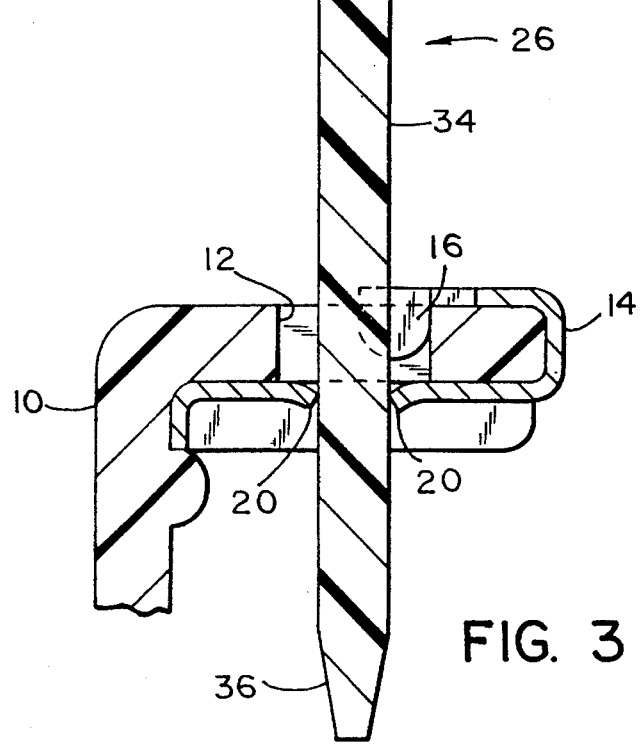
FIG. 3 is a cross-section taken substantially along the line 3—3 of FIG. 2.

Each of the base members 22 on the deployment door D connects to a spring clip 14 on the reaction canister. They are interconnected by means of plastic probe members 26. Each of the probe members 26 has at one end a cylindrical head 28 which is substantially hollow and bifurcated by a slot 30. As a result, the head 28 is sufficiently resilient to permit it to be passed through a slot 32 in the base member 22 and fit within the cylindrical socket 24 as shown in FIG. 3. The body 34 of the probe member 26 is elongated and of rectangular cross-section and terminates in a tapered tip 36.

During assembly, each of the probe members 26 is mounted in a respective base member 22 as illustrated in FIG. 3. Due to the cylinder and socket construction, there is substantial freedom of movement so that the probe members 26 are not rigidly fixed relative to the door D. Accordingly, the door D is advanced into the opening in the instrument panel P and the plastic shank 34 of each probe member 26 is inserted into the opening 18 of one of the spring clips 14. It will also be noted that the opening 18 is substantially longer than the width of the shank 34. This creates still another degree of freedom. All the assembler need do is properly align the deployment door D with the instrument panel opening and push the door into position. This causes the shank 34 of each of the probe members 26 to advance into the opening 18 of the spring clip 14, whereupon the teeth 20 are depressed inwardly as shown in FIG. 3. As a result, when the door D is finally seated, probe members 26 are firmly engaged so that subsequent withdrawal of the shank 34 is extremely difficult. However, upon subsequent airbag inflation, the base members 22 detach from the cylindrical heads 28 of each of the probe members as shown by the dash-dot lines of FIG. 1. One of the features of this invention is that the release force required to break away the deployment door D is easily adjustable by varying the length of the cylindrical attachment between the probe members 26 and the base members 22. One way of making such an adjustment is to simply vary the width of the probe members 26. When these are extruded, the extension is simply cut at the proper intervals to form probe members of the desired widths.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. A system for fastening an instrument panel deployment door of an automotive airbag restraint system simultaneously into an instrument panel opening and into engagement with an airbag containing-airbag module reaction canister which comprises:

a spring clip mounted on one of said reaction canister and deployment door, said clip defining an opening adapted to receive an elongated probe member inserted therethrough but resistant to subsequent withdrawal of said probe member upon airbag inflation;

a base member mounted to the other of said reaction canister and deployment door, said base member pivotally receiving an end of an elongated probe member; and the elongated probe member having a first end pivotally engaging said base member but forcibly detachable therefrom upon subsequent airbag inflation and a second end received in the opening of said clip upon positioning of said deployment door into said instrument panel opening.

2. The system of claim 1 wherein said spring clip is mounted on said reaction canister.

3. The system of claim 2 wherein the opening in said spring clip is defined by at least one margin which is deformable by insertion of said elongated probe.

4. The system of claim 1 wherein one of said base member and probe member defines a substantially cylindrical socket and the other carries a cylinder enclosed by said socket.

5. The system of claim 4 wherein the opening in said spring clip is defined by at least one margin which is deformable by insertion of said elongated probe.

6. The system of claim 4 wherein said cylinder is substantially hollow and bifurcated.

7. The system of claim 4 wherein the socket is defined by said base member and the cylinder is defined by the first end of said elongated probe.

8. The system of claim 7 wherein the opening in said spring clip is defined by at least one margin which is deformable by insertion of said elongated probe.

9. The system of claim 8 wherein said margin is serrated.

10. The system of claim 8 wherein said cylinder is substantially hollow and bifurcated.

11. The system of claim 10 wherein said margin is serrated.

12. The system of claim 7 wherein said cylinder is substantially hollow and bifurcated.

13. In an automotive airbag restraint system including an airbag containing-airbag module reaction canister positioned behind an instrument panel deployment door, the improvement which comprises:

at least one spring clip mounted on said reaction canister, said clip defining an opening deformable upon insertion of an elongated probe therethrough to resist subsequent withdrawal of said probe upon inflation of the airbag;

at least one substantially cylindrical socket carried by said deployment door; and an elongated locking member having a first end defining a bifurcated cylinder seated in said cylindrical socket and a second end forming an elongated probe received into the opening of said spring clip, whereby, upon inflation of the airbag of said restraint system the bifurcated cylinder is separable from the socket to permit the instrument panel deployment door to deploy.

14. The improvement of claim 13 wherein said bifurcated cylinder is substantially hollow.

15. The improvement of claim 14 wherein said probe is plastic.

16. The improvement of claim 15 wherein said spring clip is metal.

17. A system for fastening an instrument panel deployment door of an automotive airbag restraint system into an instrument panel opening and into engagement with an airbag containing-airbag module reaction canister which comprises:

a spring clip mounted on said reaction canister, said clip defining an opening adapted to receive an elongated probe member inserted therethrough but resistant to subsequent withdrawal of said elongated probe member upon airbag inflation;

a base member mounted to said reaction deployment door; and said spring clip and said base member being interconnected by an elongated probe member having a first end pivotally engaging said base member but forcibly detachable therefrom upon subsequent airbag inflation and a second end received in the opening of said clip.

18. The system of claim 17 wherein one of said base member and elongated probe member defines a substantially cylindrical socket and the other carries a cylinder enclosed by said socket.

19. The system of claim 18 wherein the socket is defined by said base member and the cylinder is defined by the first end of said elongated probe member.

20. The system of claim 19 wherein the opening in said spring clip is defined by a serrated margin which is deformable by insertion of said elongated probe member and the cylinder is substantially hollow and bifurcated.

* * * * *